US012260211B2

(12) United States Patent
Raghavan et al.

(10) Patent No.: US 12,260,211 B2
(45) Date of Patent: *Mar. 25, 2025

(54) CONTAINER BASED APPLICATION REIFICATION

(71) Applicant: Rubrik, Inc., Palo Alto, CA (US)

(72) Inventors: Ajaykrishna Raghavan, Santa Clara, CA (US); Tarun Thakur, Fremont, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,405

(22) Filed: Jan. 18, 2023

(65) Prior Publication Data

US 2023/0229437 A1 Jul. 20, 2023

Related U.S. Application Data

(63) Continuation of application No. 16/892,508, filed on Jun. 4, 2020, now Pat. No. 11,567,757, which is a continuation of application No. 16/691,979, filed on Nov. 22, 2019, now Pat. No. 11,048,501, which is a continuation of application No. 16/453,214, filed on Jun. 26, 2019, now Pat. No. 10,656,937, which is a continuation of application No. 16/392,752, filed on Apr. 24, 2019, now Pat. No. 10,579,369, which is a (Continued)

(51) Int. Cl.
*G06F 8/71* (2018.01)
*G06F 9/445* (2018.01)

(52) U.S. Cl.
CPC ............ *G06F 8/71* (2013.01); *G06F 9/44505* (2013.01)

(58) Field of Classification Search
CPC .............................. G06F 8/71; G06F 9/44505
See application file for complete search history.

(56) References Cited

U.S. PATENT DOCUMENTS 6,678,882 B1 * 1/2004 Hurley ................... G06F 8/315
717/121
8,069,435 B1 * 11/2011 Lai .......................... H04L 67/51
717/106

(Continued)

*Primary Examiner* — Lewis A Bullock, Jr.
*Assistant Examiner* — Theodore E Hebert
(74) *Attorney, Agent, or Firm* — Holland & Hart LLP

(57) ABSTRACT

Embodiments disclosed herein provide systems, methods, and computer readable media for container based application reification. In a particular embodiment, an application reification system is provided including one or more computer readable storage media and a processing system operatively coupled with the one or more computer readable storage media. The application reification system further includes program instructions stored on the one or more computer readable storage media that, when read and executed by the processing system, direct the processing system to preserve a version of application data at a first time and a configuration of an application at the first time. At a second time subsequent to the first time, the program instructions direct the processing system to create a template for a container containing the application in the configuration and a pointer to the version of the application data in a secondary storage repository.

20 Claims, 6 Drawing Sheets

Related U.S. Application Data continuation of application No. 14/975,084, filed on Dec. 18, 2015, now Pat. No. 10,379,843.

(60) Provisional application No. 62/093,788, filed on Dec. 18, 2014.

(56) References Cited

U.S. PATENT DOCUMENTS

| | | | |
|---|---|---|---|
| 8,346,929 B1* | 1/2013 | Lai | H04L 67/51 709/226 |
| 9,690,795 B1* | 6/2017 | McGrath | G06F 16/14 |
| 10,379,843 B2* | 8/2019 | Raghavan | G06F 8/71 |
| 10,579,369 B2* | 3/2020 | Raghavan | G06F 8/71 |
| 10,656,937 B2* | 5/2020 | Raghavan | G06F 8/71 |
| 11,010,157 B2* | 5/2021 | Raghavan | G06F 8/71 |
| 11,016,761 B2* | 5/2021 | Raghavan | G06F 8/71 |
| 11,048,501 B2* | 6/2021 | Raghavan | G06F 8/71 |
| 11,567,757 B2* | 1/2023 | Raghavan | G06F 8/71 |
| 2003/0101245 A1* | 5/2003 | Srinivasan | H04L 67/14 709/221 |
| 2004/0139424 A1* | 7/2004 | Mourachov | G06F 9/45504 717/148 |
| 2005/0131870 A1* | 6/2005 | Krishnaswamy | G06F 8/71 |
| 2006/0130120 A1* | 6/2006 | Brandyberry | H04N 21/25891 725/136 |
| 2006/0236068 A1* | 10/2006 | Li | G06F 3/0665 711/173 |
| 2007/0028069 A1* | 2/2007 | Sarkar | G06F 3/0631 711/170 |
| 2007/0283119 A1* | 12/2007 | Sarkar | G06F 3/0665 711/170 |
| 2008/0072235 A1* | 3/2008 | Rodgers | G06F 9/44521 718/108 |
| 2010/0325500 A1* | 12/2010 | Bashir | G06F 11/1612 714/746 |
| 2012/0005255 A1* | 1/2012 | Cherukuri | G06Q 10/10 709/203 |
| 2013/0055145 A1* | 2/2013 | Antony | G05B 23/024 715/781 |
| 2015/0161155 A1* | 6/2015 | Pletcher | G06F 3/0643 707/693 |
| 2016/0179509 A1* | 6/2016 | Raghavan | G06F 8/71 717/121 |
| 2019/0250909 A1* | 8/2019 | Raghavan | G06F 8/71 |
| 2019/0317758 A1* | 10/2019 | Raghavan | G06F 8/71 |
| 2020/0089490 A1* | 3/2020 | Raghavan | G06F 8/71 |
| 2021/0089298 A1* | 3/2021 | Raghavan | G06F 8/71 |

* cited by examiner

CONTAINER BASED APPLICATION REIFICATION

RELATED APPLICATIONS

This present application is a continuation of and claims the benefit of priority of U.S. patent application Ser. No. 16/892,508 by RAGHAVAN et al., entitled "CONTAINER BASED APPLICATION REIFICATION," filed Jun. 4, 2020, which is a continuation of U.S. patent application Ser. No. 16/691,979 by RAGHAVAN et al., entitled "CONTAINER BASED APPLICATION REIFICATION," filed Nov. 22, 2019, now U.S. Pat. No. 11,048,501, which is a continuation of U.S. patent application Ser. No. 16/453,214 by RAGHAVAN et al., entitled "CONTAINER BASED APPLICATION REIFICATION," filed Jun. 26, 2019, now U.S. Pat. No. 10,656,937, which is a continuation of U.S. patent application Ser. No. 16/392,752 by RAGHAVAN et al., entitled "CONTAINER BASED APPLICATION REIFICATION," filed Apr. 24, 2019, now U.S. Pat. No. 10,579,369, which is a continuation of U.S. patent application Ser. No. 14/975,084 by RAGHAVAN et al., entitled "CONTAINER BASED APPLICATION REIFICATION," filed Dec. 18, 2015, now U.S. Pat. No. 10,379,843, which claims the benefit of U.S. Provisional Patent Application No. 62/093,788 by RAGHAVAN et al., entitled "CONTAINER BASED APPLICATION REIFICATION," filed Dec. 18, 2014, each of which is assigned to the assignee hereof, and each of which is expressly incorporated by reference herein.

TECHNICAL BACKGROUND

Software containers, such as virtual machines and Linux containers (e.g. Docker containers), allow applications to be "sandboxed" on a computer system. This sandboxing allows an application and its data to be separated from other applications. Furthermore, containers allow further separation between an application, a physical computing system, and operating system thereon. Essentially, a container virtualizes the interface between the application and the computing system on which it is executing. Under such an arrangement, the container can regulate any interaction between the application and the computing system or its operating system.

Overview

Embodiments disclosed herein provide systems, methods, and computer readable media for container based application reification. In a particular embodiment, an application reification system is provided including one or more computer readable storage media and a processing system operatively coupled with the one or more computer readable storage media. The application reification system further includes program instructions stored on the one or more computer readable storage media that, when read and executed by the processing system, direct the processing system to preserve a version of application data at a first time and a configuration of an application at the first time. At a second time subsequent to the first time, the program instructions direct the processing system to create a template for a container containing the application in the configuration and a pointer to the version of the application data in a secondary storage repository.

In some embodiments, the application executes in the container on a host system and operates on the version of the application data.

In some embodiments, the program instructions further direct the processing system to transfer the template to the host system on which the application executes in the container.

In some embodiments, the host system provides an amount of computing resources equal to or scaled from a production environment for the application at the first time.

In some embodiments, to direct the processing system to preserve the version of the application data at a first time, the program instructions direct the processing system to identify items of the application data in a primary storage repository that have changed since a previous version was created and create the version of the application data in the secondary storage repository.

In some embodiments, to direct the processing system to preserve the configuration of the application at the first time, the program instructions direct the processing system to store the configuration in the secondary storage repository with the version of the application data.

In some embodiments, the configuration includes parameters of the application to replicate processing results of the application that would have occurred at the first time.

In some embodiments, the program instructions further direct the processing system to perform data integrity checks on the version of the application data.

In another embodiment, a method of application reification provides preserving a version of application data at a first time and a configuration of an application at the first time. At a second time subsequent to the first time, the method provides creating a template for a container containing the application in the configuration and a pointer to the version of the application data in a secondary storage repository.

In yet another embodiment, a host system is provided including one or more computer readable storage media and a processing system operatively coupled with the one or more computer readable storage media. The host system further includes program instructions stored on the one or more computer readable storage media that, when read and executed by the processing system, direct the processing system to receive an instruction from a user to reify an application in a configuration at a first time and a version of application data for the application preserved at a first time. The program instructions further direct the processing system to request, from an application reification system, a template for a container containing the application in the configuration and a pointer to the version of the application data in a secondary storage repository. Also, the program instructions direct the processing system to receive the template from the application reification system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provides for reification of an application using a container. The container may be any type of container, including but not limited to virtual machines, Linux containers, or any other type of software container having similar functionality. Containers allow for an operating system of a physical computing system to have multiple isolated processing spaces. For instance, one application, or other type of computing process, executing within one container is unaware of another application executing with another container even though the two containers are executing on the same computing system.

Also, many types of containers have the added benefit of easily deploying an instance of an application. Specifically, within a container an application can be encapsulated with all of the application's configurations, dependencies, and required resources (e.g. network interfaces, storage, etc.). Therefore, when new instances of an application are needed, a container for the application can be quickly instantiated, copied on the same computing system, copied to another computing system, or moved to another computing system.

The embodiments herein use containers to allow reification of a version of the application from data in the secondary repository (e.g. backup) rather than data currently in a primary production environment. When used in this way, containers negate the need to copy out data from the secondary repository, automate the workflow of using a version of the data in the secondary repository (e.g. running data integrity checks, setting up application with appropriate configurations, etc), and enable creation of multiple sandboxed environment that allows the user to recreate the primary production environment or a scaled down version of it.

Figure 1:
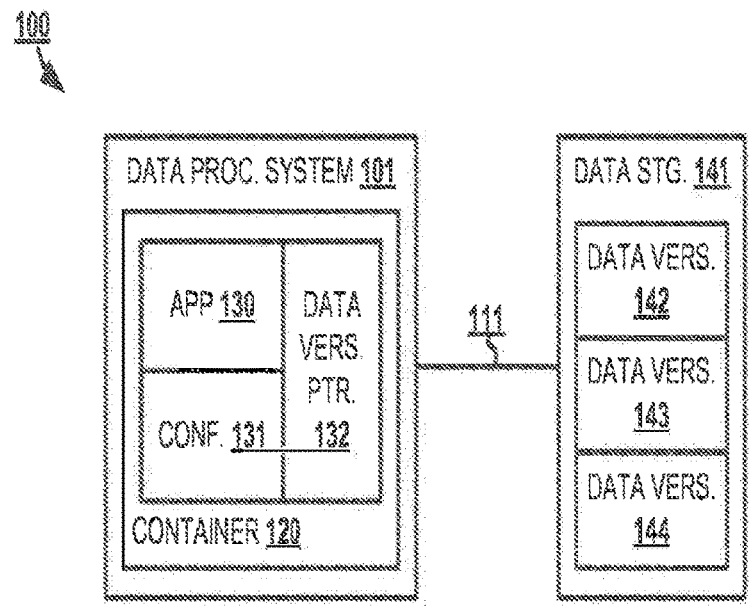
FIG. 1 illustrates a computing environment for container based application reification.

FIG. 1 illustrates computing environment 100 in an example scenario of container based application reification. Computing environment 100 includes data processing system 101 and data storage system 141. Data processing system 101 includes application 130, application configuration 131, and data version pointer 132. Data storage system 141 includes data versions 142, 143, and 144. Data processing system 101 and data storage system 141 communicate over communication link 111.

In operation, application 130 comprises an application that operates on application data. Typically application 130 operates on data currently in a primary production environment. The primary production environment may include data stored on data processing system 101 or elsewhere, such as a remote storage system on a local or wide area network. In this example, however, application 130 is executing within container 120. Container 120 directs application 130 to operate on one of data versions 142-144 using data version pointer 132, which points to one of data versions 142-144. The use of data version pointer 132 allows application 130 to operate normally as though it is operating on production data when application 130 is actually operating on a version of application data in a secondary data repository on storage system 141. Thus, while application 130 may request a particular item of production data, data version pointer 132 points to a version of the item in the secondary repository. The version 142-144 pointed to by data version pointer 132 may be indicated by a user, may be marked as a version of the data that existed in the primary production environment during a previous execution of application 103 (as described below), or may be defined by some other means.

In addition to pointer 132, container 120 also maintains a configuration 131 of application 130. Configuration 131 may contain parameters within application 130 itself or may include parameters external to application 130 while still affecting how application 130 executes. For example, many containers virtualize computing elements, such as operating system or hardware (e.g. processor, memory, network interfaces, etc.) modules, on which the application executes. Configuration 131 may include any parameters for these computing elements that have an effect on the operation of application 130 (e.g. the number of network interfaces affect how application 130 operates while the addresses of those interfaces do not). Like pointer 132, configuration 131 may be user indicated, may correspond to a past configuration for executing application 130, or may be defined by some other means.

As noted above, data storage system 141 is a secondary data repository wherein versions 142-144 of data are stored. Data versions 142-144 may correspond to versions of application data as the application data existed at respective points in time. For example, versions 142-144 may each comprise a backup or snapshot of application data a various points in time. That is, data version 142 may comprise the application data at a first time and data versions 143 and 144 comprise the application data at second and third later times, respectively. Moreover, data versions 142-144 may only track the changes between each data version such that unchanged data does not need to be stored in data storage system 141 multiple times. Thus, if a particular data item does not change from version 142 to 144, the data item is only stored once while still being included in each version.

Advantageously, application configuration 131 and data version pointer 132 within container 120 allows a user to recreate a primary production environment from a prior time in which application 130 can execute. In particular, configuration 131 allows application 130 to execute using the same configuration as during the previous time. Likewise, data version pointer 132 points to the application data version of data versions 142-144 that existed during that previous time.

Figure 2:
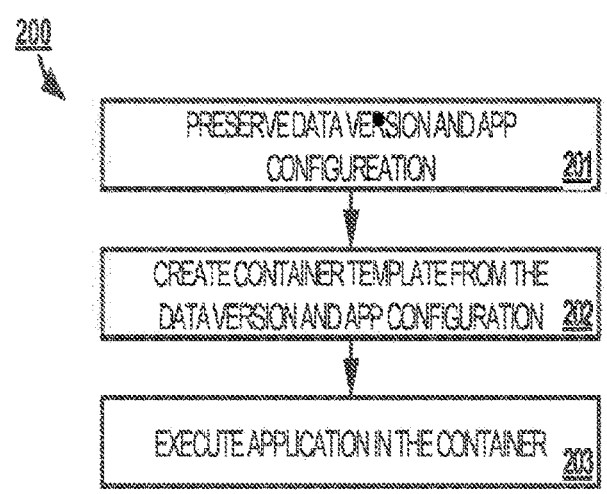
FIG. 2 illustrates an operation of the computing environment for container based application reification.

FIG. 2 illustrates operation 200 of computing environment 100 for container based application reification. Operation 200 includes preserving a version of application data at a first time and a configuration of application 130 at the first time (step 201). Preserving the version may comprise creating a backup or snapshot of the current productions data at the first time and storing the data as one of versions 142-144 on data storage system 141. Alternatively, the version may be automatically backed up as part of another operation.

Regardless, information indicating the version, which may be pointer 132 itself, and indicating configuration 131 are stored in a storage component of system 101, in storage system 141, or elsewhere for later access. Additionally, in some examples, application 130 itself (e.g. the binaries for application 130, an installer, or otherwise) may be preserved. Preserving application 130 allows for the exact same version of application 130 to be reified in the steps below. Otherwise, it is possible that application 130 may differ due to updates or otherwise.

At a second time subsequent to the first time, operation 200 provides creating a template for container 120 containing application 130 in configuration 131 and a pointer 132 to the version of the application data in a storage repository of data storage system 141 (step 202). The template is created using the information stored during step 201 to indicate configuration 131 and the data version. Step 202 may be triggered at the request of a user when the user decides to reify application 130 as it was at the first point in time. For example, the user may choose to reify application 130 as it was at the point in time corresponding to data version 143. Step 202 therefore creates the template with a pointer 132 that points to data version 143 and has configuration 131 corresponding to the configuration of application 130 at the time data version 143 was created.

In some examples, once created, integrity checks are performed on the data version indicated by pointer 132. These checks ensure that, once application 130 is executed, the data upon which application 130 is operating is not corrupted and will produce valid results.

Operation 200 then provides executing application 130 in the container 120 (step 203). Container 120 causes application 130 to operate on the version of the application data pointed to by pointer 132 (e.g. version 143 from the example above) rather than current production environment data. Furthermore, container 120 uses configuration 131 to execute application 130. Accordingly, container 120 is able to replicate at least a portion of the primary production environment for application 130 as it existed at the first time.

Referring back to FIG. 1, data processing system 101 comprises a computer system and communication interface. Data processing system 101 may also include other components such as a router, server, data storage system, and power supply. Data processing system 101 may reside in a single device or may be distributed across multiple devices. Data processing system 101 could be an application server (s), a personal workstation, or some other network capable computing system—including combinations thereof.

Data storage system 141 comprises a communication interface and one or more non-transitory storage medium, such as a disk drive, flash drive, magnetic tape, data storage circuitry, or some other memory apparatus. Data storage system 141 may also include other components such as processing circuitry, a router, server, data storage system, and power supply. Data storage system 141 may reside in a single device or may be distributed across multiple devices. Data storage system 141 is shown externally to data processing system 101, but system 141 could be integrated within the components of data processing system 101.

Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be a direct link or may include intermediate networks, systems, or devices.

Figure 3:
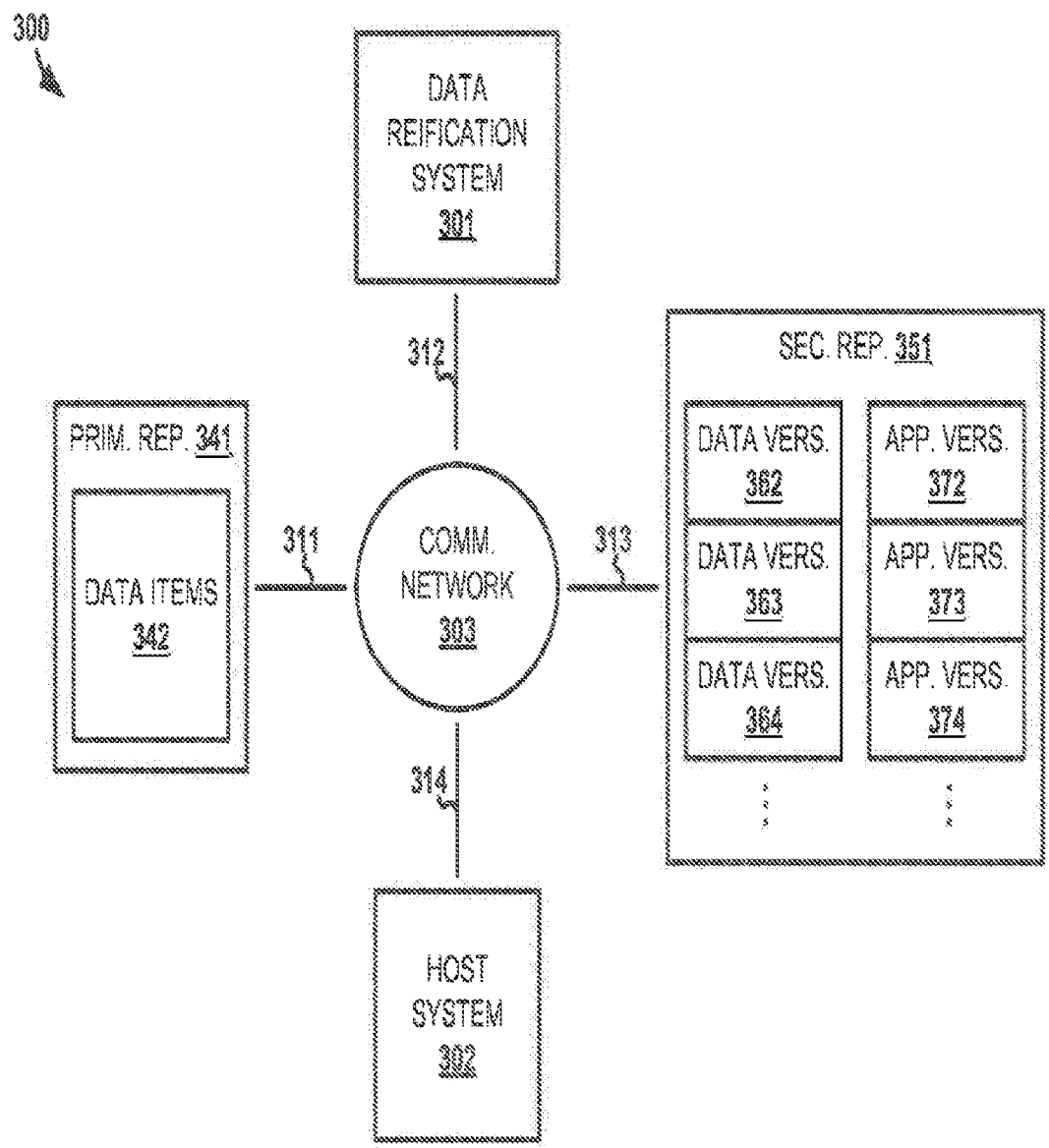
FIG. 3 illustrates another computing environment for container based application reification.

FIG. 3 illustrates computing environment 300 in an example scenario of container based application reification. Computing environment 300 includes application reification system 301, host system 302, communication network 303, primary data repository 341, and secondary data repository 351. Application reification system 301, host system 302, primary data repository 341, and secondary data repository 351 communicate with communication network 303 over communication links 311-314, respectively.

Communication network 303 comprises network elements that provide communications services to connected systems and devices. Communication network 303 may comprise switches, wireless access nodes, Internet routers, network gateways, application servers, computer systems, communication links, or some other type of communication equipment—including combinations thereof. Communication network 303 may be a single network, such as a local area network, a wide area network, or the Internet, or may be a combination of multiple networks.

In operation, primary data repository 341 stores data items 342 in a data storage system, which may be similar to data storage system 141. Data items 342 may comprise a database accessible by host system 302 or other computing systems. Secondary data repository 351 may also comprise a data storage system similar to data storage system 141. Secondary data repository 351 stores data versions 362-364, which are three most recent data versions of potentially many older data versions also stored in secondary data repository 351 though not shown. Secondary data repository 351 also stores application versions 372-374, which are three of potentially many more application versions stored in secondary data repository 351 though not shown. Application versions 372-374 are versions of one or more applications, including configurations of those applications at the time the application versions were captured for storage in secondary data repository 351.

Figure 4:
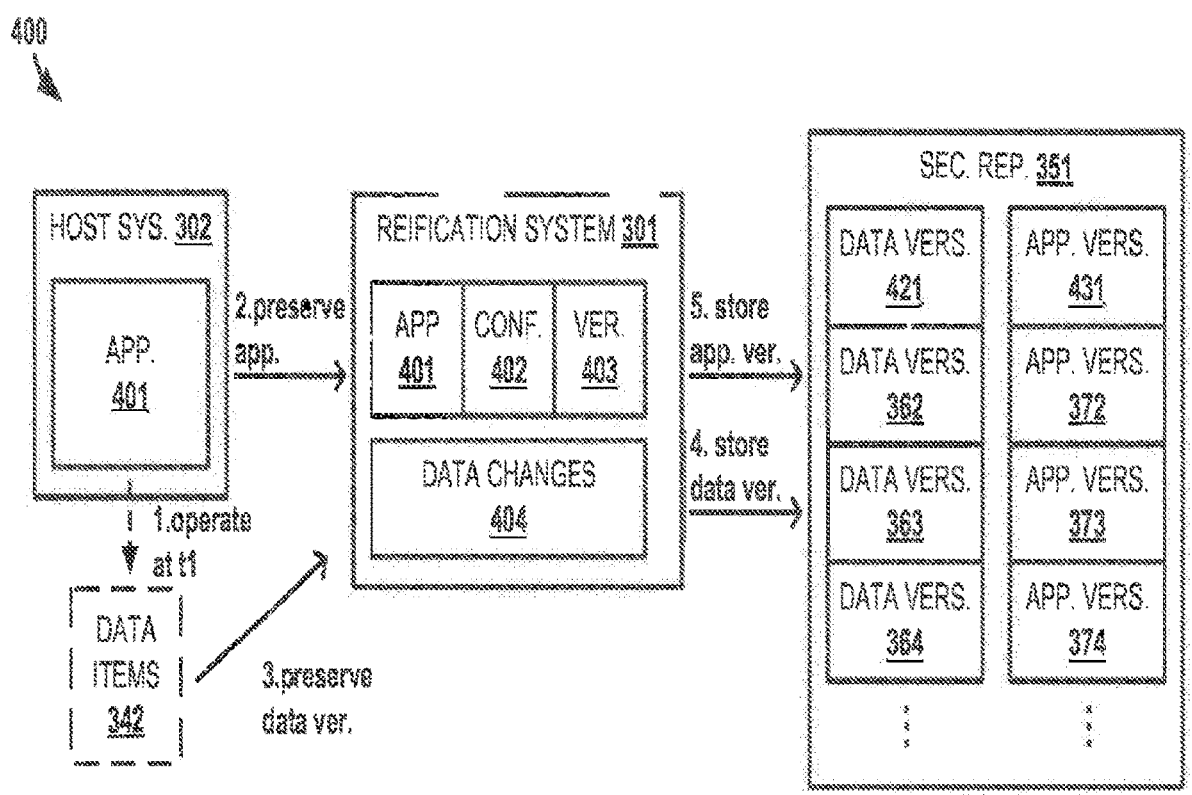
FIG. 4 illustrates an operational scenario of the other computing environment to preserve an application and data for the application in an example of container based application reification.

FIG. 4 illustrates operational scenario 400 for computing environment 300 to preserve an application and data for the application in an example of container based application reification. In scenario 400, host system 302 is executing application 401. Application 401 may be executing natively on host system 302 or may be executing in a container on host system 302. Regardless, application 401 is currently able to operate on data items 342, which is time t1 in accordance with step 1. As noted above, data items 342 represent the current state of the data items accessible and in production on primary data repository 341.

At step 2, application reification system 301 preserves application 401 in application 401's current state at time t1. To preserve application 401, application reification system 301 obtains a copy of the software version for application 401 as is executing on host system 302 at time t1. In some examples, application reification system 301 may only need to obtain information identifying the software version for application 401. The actual software in those examples may be stored elsewhere or will be otherwise obtainable based on the identifying information should application 401 be reified, as described below. Additionally, application reification system 301 determines configuration 402 of application 401 at time t1. Configuration 402 may include settings within application 402, information about hardware resources (virtual or physical) allocated to application 401, parameters under which application 401, or any other information that may be necessary to replicate application 401's operation as it was at time t1. For example, a number of interfaces used by application 401 may be necessary for configuration 402 but the actual addresses of the interfaces are not. Furthermore, application reification system 301 provides application data version identifier 403, which indicates the version of data items data items 342 upon which application 401 is operating at time t1.

More specifically, at step 3, which may occur substantially concurrent to step 2, changes 404 to data items 342 since a most recent data version was created of data items 342 are identified by application reification system 301. These changes are stored at step 4 in secondary data repository 351 as data version 421, which is an incremental data version of data items 342 that depends from data version 362. Data version 362 in turn depends from data version 363, and so on. It is therefore data version 421 that application data version identifier 403 identifies above as the data stored in data version 421 and in the data versions from which it depends because data versions 421 represents data items 342 at time t1.

At step 5, which may occur substantially concurrent to step 4, application 401, configuration 402, and application data version identifier 403 are stored as application version 431. While application version 431 is stored in secondary data repository 351 along with data versions 421 and 362-364, application version 431 may be stored elsewhere, such as on application reification system 301 itself.

Figure 5:
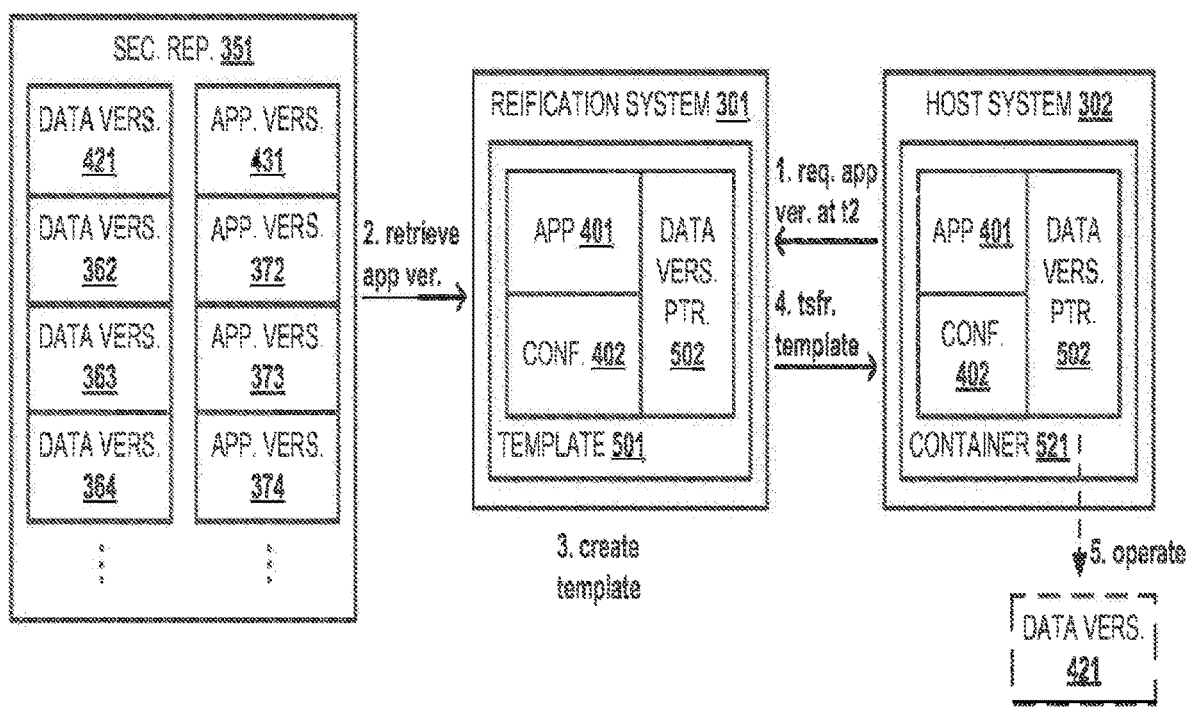
FIG. 5 illustrates an operational scenario of the other computing environment for container based application reification.

FIG. 5 illustrates operational scenario 500 for computing environment 300 for container based application reification. In scenario 500, at a time t2 after time t1, host system 302 requests that application version 431 be reified in a container on host system 302 at step 1. Host system 302 may request application version 431 upon receiving an instruction from a user of host system host system 302, from a user of another system in communication with host system 302, or may be triggered by some other event. While host system 302 in this example is the same system that was executing application 401 at time t1, it should be understood that the same system that executed application 401 at time t1 does not have to be the same system to which application 401 is reified. In this case, host system 302 can provide an exact replica of the resources used by application 401 at time t1 although, in other cases, the resources provided by a host system may instead be a scaled version of those used by application 401 at time t1. In other examples, the functionality of host system 302 may be incorporated into application reification system 301.

In response to the request, application reification system 301 retrieves application version 431 from secondary data repository 351 at step 2. While no additional data versions or application versions are shown to have been stored in secondary data repository 351 since the completion of scenario 400 above, any number of additional data versions and application versions could have been stored in secondary data repository 351 before time t2 arrived.

Once application version 431 is retrieved from secondary data repository 351, application reification system 301 creates template 501 at step 3. Template 501 includes information necessary for host system 302 to instantiate a container that will execute application 401. In particular, template 501 includes the software version of application 401 as was executing at time t1. The software version of application 401 may have been stored in application version 431 or may have been retrieved from elsewhere and merely identified within application version 431. Template 501 further includes configuration 402 so that application 401 can be executed in the same configuration as application 401 was executing at time t1. Additionally, template 501 includes data version pointer 502, which points to data version 421 stored in secondary data repository 351, as what identified by application data version identifier 403 in application version 431. Template 501 may further define additional parameters necessary for instantiating a container, such as the type of container, an operating system for the container, parameters for that operating system, or some other type of information relevant to the operation of a container.

Template 501 is then transferred to host system 302 at step 4. Upon receiving template 501, host system 302 instantiates container 521 from template 501. Container 521 may be a new container or may be an existing container that is configured using template 501 to become container 521. In some cases, container 521 comprises the container that was executing application 401 at time t1. In those cases, container 521 may have been continually running since time t1 or may itself have been preserved for reification of application 401 or for some other purpose. Container 521 executes application 401 therein on host system 302 using the configuration 402 provided by template 501. During execution, data version pointer 502 directs application 401 to operate on data version 421 in secondary data repository 351 at step 5. Using data version pointer 502 allows container 521 to redirect requests from application 401 for data items 342, which have likely been changed since time t1, to data items within data version 421 (or within a data version from which data version 421 depends), which represents data items 342 at time t1. In some examples, rather than simply pointing to data version 421, at least some of the data in data version 421 may be restored to container 521 or elsewhere for use by application 401.

Advantageously, storing application version 431 in the manner described above allows for the reification of application 401 at time t2 in the same state application 401 was executing at time t1. This state includes the data items on which application 401 was operating at time t1, which are now stored as data version 421, without having to first restore data version 421 from secondary data repository 351. As such, the data resulting from the execution of application 401 at time t1 on data items 342 will be the same as when application 401 operates in container 521 on data version 421 at time t2. Moreover, operational scenario 500 offers the flexibility of reifying application 401 and its data, data version 421, from time t1 on any system capable of executing container 521.

Figure 6:
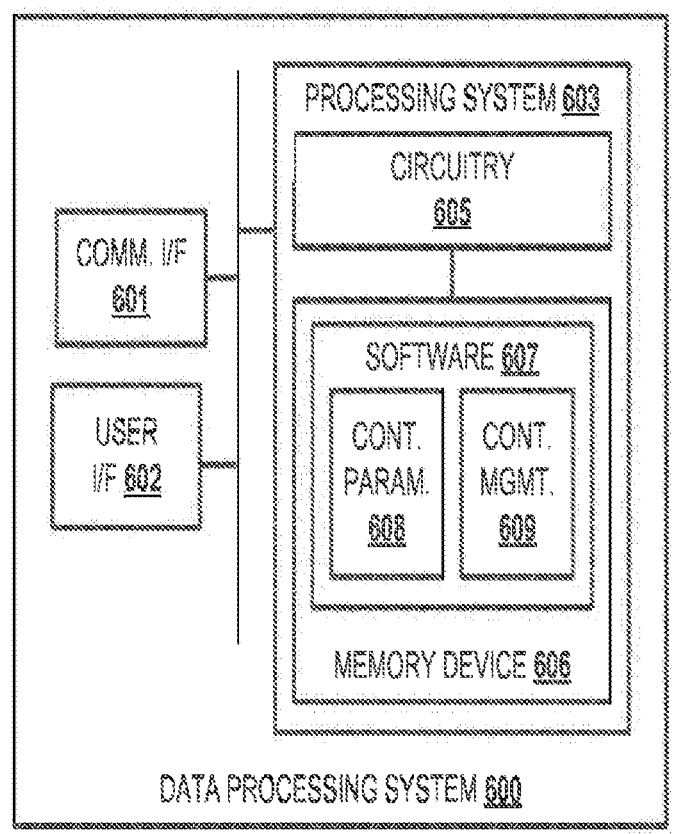
FIG. 6 illustrates a data processing system for container based application reification.

FIG. 6 illustrates data processing system 600. Data processing system 600 is an example of data processing system 101 and/or application reification system 301, although systems 101 and 301 may use alternative configurations. Data processing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes container parameters module 608 and container management module 609. Operating software 607 may further include an operating system, utilities, drivers, network interfaces, applications, or some other type of software. When executed by circuitry 605, operating software 607 directs processing system 603 to operate Data processing system 600 as described herein.

In particular, container parameters module 608 directs processing system 603 to preserve a version of application data at a first time and a configuration of an application at the first time. At a second time subsequent to the first time, container management module 609 directs processing system 603 to create a template for a container containing the application in the configuration and a pointer to the version of the application data in a storage repository. In some examples, container management module 609 further directs processing system 603 to execute the application in the container, wherein the application operates on the version of the application data.

Figure 7:
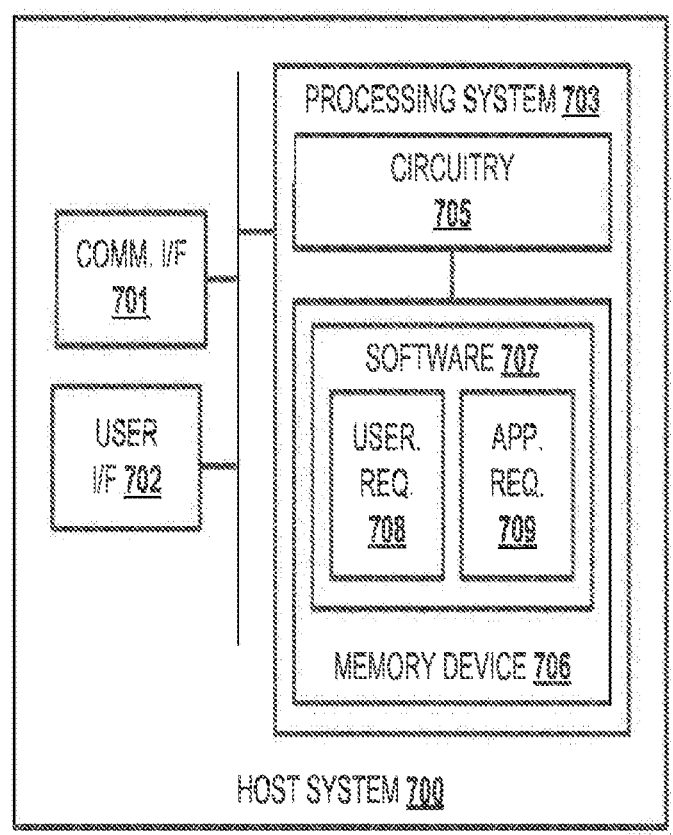
FIG. 7 illustrates a host system for container based application reification.

FIG. 7 illustrates host system 700. Host system 700 is an example of host system 302, although system 302 may use alternative configurations. Host system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes user request module 708 and application request module 709. Operating software 707 may further include an operating system, utilities, drivers, network interfaces, applications, or some other type of software. When executed by circuitry 705, operating software 707 directs processing system 703 to operate Host system 700 as described herein.

In particular, user request module 708 directs processing system 703 to, at a second time, receive an instruction from a user to reify an application in a configuration at a first time prior to the second time and a version of application data for the application preserved at the first time. Application request module 709 directs processing system 703 to request, from an application reification system, a template for a container containing the application in the configuration and a pointer to the version of the application data in a secondary storage repository. Application request module 709 directs processing system 703 to receive the template from the application reification system. In some examples, operating software 707 directs processing system 703 to instantiate the container and execute the application in the configuration therein, wherein the application operates on the version of the application data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. An application reification system comprising:
    a processing system; and
    one or more computer readable storage media, operatively coupled to the processing system, including program instructions that, when executed by the processing system, cause the processing system to:
        preserve, at a secondary storage repository different from a host system, a backup of application data at a first time, the application data reflecting a state of an application at the first time, the application executing on the host system at the first time;
        preserve, at the secondary storage repository, a backup of an application configuration of the application at the first time, the application configuration including information associated with execution of the application at the first time;
        receive, at a second time subsequent to the first time, a request to reify the application, in the state corresponding to the first time, in a container on a target system;
        create a container template, the container template including information associated with instantiating the container executing the application at the state corresponding to the first time based at least in part on the backup of the application configuration and an indication of a version of the backup of application data that corresponds to the first time; and
        in response to the request:
            provide the container template to the target system for reifying the application, in the state corresponding to the first time, in the container; and
            instantiate, based at least in part upon the container template, the container executing the application in the state corresponding to the first time on the target system, wherein, upon execution, the application is reified based at least in part upon the version of the backup of application data and the backup of the application configuration.

2. The application reification system of claim 1, wherein the indication of the version of the backup of application data comprises a pointer to the application data stored in the secondary storage repository.

3. The application reification system of claim 1, wherein the target system is the host system.

4. The application reification system of claim 1, wherein the application configuration includes parameters of the application to replicate processing results of the application corresponding to the first time.

5. The application reification system of claim 1, wherein the program instructions, when executed by the processing system, cause the processing system to:
    perform a data integrity check on the backup of application data.

6. The application reification system of claim 1, wherein the program instructions, when executed by the processing system, cause the processing system to:
    provide an amount of computing resources to reify the application in the container on the target system, wherein the amount of computing resources is equal to or scaled from a production environment for the application.

7. The application reification system of claim 1, wherein the application is executing within a host container on the host system, and the application configuration includes parameters related to computing elements associated with the host container.

8. A method of application reification, the method comprising:
    preserving, at a secondary storage repository different from a host system, a backup of application data at a first time, the application data reflecting a state of an application at the first time, the application executing on the host system at the first time;
    preserving, at the secondary storage repository, a backup of an application configuration of the application at the first time, the application configuration including information associated with execution of the application at the first time;
    receiving, at a second time subsequent to the first time, a request to reify the application, in the state corresponding to the first time, in a container on a target system;
    creating a container template, the container template including information associated with instantiating the container executing the application at the state corresponding to the first time based at least in part on the backup of the application configuration and an indication of a version of the backup of application data that corresponds to the first time; and
    in response to the request:
        providing the container template to the target system for reifying the application, in the state corresponding to the first time, in the container; and
        instantiating, based at least in part upon the container template, the container executing the application in the state corresponding to the first time on the target system, wherein, upon execution, the application is reified based at least in part upon the version of the backup of application data and the backup of the application configuration.

9. The method of claim 8, wherein the indication of the version of the backup of application data comprises a pointer to the application data stored in the secondary storage repository.

10. The method of claim 8, wherein the target system is the host system.

11. The method of claim 8, wherein the application configuration includes parameters of the application to replicate processing results of the application corresponding to the first time.

12. The method of claim 8, further comprising:
    performing a data integrity check on the backup of application data.

13. The method of claim 8, further comprising:
    providing an amount of computing resources to reify the application in the container on the target system, wherein the amount of computing resources is equal to or scaled from a production environment for the application.

14. The method of claim 8, wherein the application is executing within a host container on the host system, and the application configuration includes parameters related to computing elements associated with the host container.

15. One or more non-transitory computer-readable storage media including instructions that, when executed by a processing system, cause the processing system to:
    preserve, at a secondary storage repository different from a host system, a backup of application data at a first time, the application data reflecting a state of an application at the first time, the application executing on the host system at the first time;
    preserve, at the secondary storage repository, a backup of an application configuration of the application at the first time, the application configuration including information associated with execution of the application at the first time;
    receive, at a second time subsequent to the first time, a request to reify the application, in the state corresponding to the first time, in a container on a target system;
    create a container template, the container template including information associated with instantiating the container executing the application at the state corresponding to the first time based at least in part on the backup of the application configuration and an indication of a version of the backup of application data that corresponds to the first time; and
    in response to the request:
        provide the container template to the target system for reifying the application, in the state corresponding to the first time, in the container; and
        instantiate, based at least in part upon the container template, the container executing the application in the state corresponding to the first time on the target system, wherein, upon execution, the application is reified based at least in part upon the version of the backup of application data and the backup of the application configuration.

16. The one or more non-transitory computer-readable storage media of claim 15, wherein the target system is the host system.

17. The one or more non-transitory computer-readable storage media of claim 15, wherein the application configuration includes parameters of the application to replicate processing results of the application corresponding to the first time.

18. The one or more non-transitory computer-readable storage media of claim 15, wherein the instructions, when executed by the processing system, cause the processing system to:
    perform a data integrity check on the backup of application data.

19. The one or more non-transitory computer-readable storage media of claim 15, wherein the instructions, when executed by the processing system, cause the processing system to:
provide an amount of computing resources to reify the application in the container on the target system, wherein the amount of computing resources is equal to or scaled from a production environment for the application.

20. The one or more non-transitory computer-readable storage media of claim 15, wherein the application is executing within a host container on the host system, and the application configuration includes parameters related to computing elements associated with the host container.

* * * * *